US006633223B1

United States Patent
Schenker et al.

(10) Patent No.: US 6,633,223 B1
(45) Date of Patent: Oct. 14, 2003

(54) WIRELESS LAN SCHOLASTIC TRACKING SYSTEM

(75) Inventors: Andrew J. Schenker, Smithtown, NY (US); Michael Fluharty, Glenelg, MD (US); Jerome Swartz, Old Field, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/247,389

(22) Filed: Feb. 10, 1999

(51) Int. Cl.⁷ .............................. G05B 19/00
(52) U.S. Cl. ............... 340/5.53; 340/5.61; 434/353; 382/115
(58) Field of Search ................ 340/5.53, 5.6, 340/5.61, 5.64, 5.83, 7.21, 7.27, 7.4, 7.2; 434/353, 354, 351; 235/380; 382/115

(56) References Cited

U.S. PATENT DOCUMENTS

| | | | | |
|---|---|---|---|---|
| 4,978,305 A | * | 12/1990 | Kraft | 434/353 |
| 5,199,068 A | * | 3/1993 | Cox | 340/5.83 |
| 5,311,570 A | * | 5/1994 | Grimes et al. | 340/7.21 |
| 5,488,356 A | * | 1/1996 | Martinovich et al. | 340/7.4 |
| 5,509,083 A | * | 4/1996 | Abtahi et al. | 235/380 |
| 5,594,806 A | * | 1/1997 | Colbert | 382/115 |
| 5,675,627 A | * | 10/1997 | Yaker | 340/7.2 |
| 5,947,747 A | * | 9/1999 | Walker et al. | 434/354 |
| 5,974,034 A | * | 10/1999 | Chin et al. | 340/7.27 |
| 6,024,287 A | * | 2/2000 | Takai et al. | 340/5.83 |
| 6,040,783 A | * | 3/2000 | Houvener et al. | 340/5.53 |
| 6,144,848 A | * | 11/2000 | Walsh et al. | 340/5.91 |
| 6,230,970 B1 | * | 5/2001 | Walsh et al. | 235/472.01 |
| 6,292,092 B1 | * | 9/2001 | Chow et al. | 340/5.53 |

* cited by examiner

Primary Examiner—Brian Zimmerman
(74) Attorney, Agent, or Firm—Kirschstein, et al.

(57) ABSTRACT

An improved system and method for tracking of student attendance and student movement, the monitoring of student possession and use of institutional inventory, securing authorized student access to the institution and test sessions, and monitoring student progress in learning employing a data processing telecommunications network having wireless communication capability, an electro-optical reader, a student identity card having encoded indicia thereon correlatable to the student's identity and readable by the electro-optical reader, and a processor for correlating confirmed student identity information with student activity information.

6 Claims, 5 Drawing Sheets

WIRELESS LAN SCHOLASTIC TRACKING SYSTEM

BACKGROUND OF INVENTION

1. Field of Invention

The present invention relates generally to a system and method for improving control over transmission of information in an environment, such as a school or other logistically challenged environment. More particularly, the present transmitting invention generally relates to a data processing telecommunication network capable of receiving and processing wireless transmissions from mobile stations which may be used in academic institutions permitting, for example, real time tracking of attendance and personnel movement, real time monitoring and modification of student records, improved security with respect to institutional access and test session admission, improved grading of student exams and improved monitoring of student outstanding credits and debits. More particularly, a preferred embodiment of the present invention relates to an academic data processing telecommunication network capable of communicating with a mobile electro-optical reader for electro-optically reading and/or analyzing encoded indicia. Although in a preferred embodiment described herein involves information exchange in a scholastic environment, the present invention is applicable to a much broader class of environments, including, for example, manufacturing, trading, military institutions, hospitals, government buildings and retail.

2. Brief Description of the Related Art

Local area networks ("LANs") are data processing telecommunication networks which allow a number of data processing units to communicate with each other and with a network server through dedicated channels. Typically a LAN encompasses a limited distance, usually one building or several buildings in close proximity. Conventionally, data processing units in a LAN have been interconnected by means of either electrical line or optical fiber. Portable data processing units traditionally have been given access to the LAN by means of one or more plug-in connectors interconnected to the LAN, and positioned at fixed points at data processing stations. As is known in the art, such conventional cabled interconnection entails considerable expense in requiring new cabling each time a new plug-in connector is desired.

Because of the numerous disadvantages associated with entirely physically-cabled data processing telecommunication networks, so-called "wireless" data processing telecommunication networks, such as the "wireless LAN", have developed. Such "wireless" data processing telecommunication networks have at least a part of the network communicating with another part of the network by aerial transmission. Such wireless data processing telecommunication networks frequently employ infrared light or radio wave propagation as the transmission system.

In a conventional wireless LAN, information is typically transmitted from wireless stations, having one or more antennas for transmitting and receiving messages, to an access point (or base station), which provides access to the infrastructure network, such as an Ethernet. In a typical wireless LAN, information which is to flow between the wireless stations must first be received at the access point and then re-transmitted to the wireless station that needs the information. Wireless systems exist, however, such as described in U.S. Pat. No. 5,768,531, the disclosure of which is herein incorporated by reference, wherein wireless stations may transmit signals directly to one another when the destination station is in the same service area and the communication link quality is reasonable. The access point may be connected by cable to a backbone LAN, connected to other devices and/or networks which stations in the LAN may communicate, or may communicate with the LAN by wireless transmission. The access point typically has one or more antennas for transmitting and receiving messages over the wireless communication channel. Each wireless station may be assigned an address which is consistent with other LAN addresses on the backbone LAN.

A conventional wireless LAN of the prior art is depicted in FIG. 1. Mobile stations 18-1, 18-2, 18-3 and 18-4, having antennas 24-1, 24-2, 24-3 and 24-4, respectively, transmit aerially a signal to one or more access points, 14-1, 14-2 and 16, which may be physically cabled, 14-1 and 14-2, to backbone LAN 10, or un-cabled, 16, to backbone LAN 10. Access points, 14-1, 14-2 and 16, have antennas 22-1, 22-2, 22-3, respectively, for transmitting and receiving messages in the aerial transmission. Cabled access points, 14-1 and 14-2, and non-cabled access point, 16, serve as base stations permitting communication by aerial transmission between backbone LAN 10 and mobile stations 18-1, 18-2, 18-3 and 18-4, such that backbone LAN 10 may receive data from, and communicate data to, mobile stations 18-1, 18-2, 18-3 and 18-4. The signal sent by one mobile station, 18-1, 18-2, 18-3 and 18-4, may be forwarded by an access point, 14-1 and 14-2, receiving the signal, to another mobile station, 18-1, 18-2, 18-3 and 18-4. Mobile stations, 18-1, 18-2, 18-3 and 18-4, signals may alternatively be transmitted directly to another mobile station. Each mobile station, 18-1, 18-2, 18-3 and 18-4, may be assigned an address which is consistent with other LAN addresses on backbone LAN 10. Thereby, messages may be transmitted to any mobile station, 18-1, 18-2, 18-3 and 18-4, by broadcasting it on backbone LAN 10.

For example, access point 14-2 may broadcast a message on backbone LAN 10 having an address destined for mobile station 18-4. When access point 14-2 receives the message, it recognizes the address of mobile station 18-4 as one of the stations in its service area, and transmits the message to mobile station 18-4. As the other access point, 14-1, on backbone LAN 10 does not have mobile station 18-4 listed in its service area, it does not respond to the message intended for mobile station 18-4. For example, access point 14-1 may broadcast a message to mobile station 18-2. Backbone LAN 10 may be combined also with peripherals (not depicted), such as printers, modems, etc. As would be appreciated by one of skill in the art, wireless communication between the mobile stations and other data processing telecommunication networks, such as PBX, and other network topologies, such as a token ring, may be employed in the present invention.

Because of their great flexibility and the lack of need for expensive cabling, wireless LANs have found widespread employment since their. inception. For example, transactions on many of the stock exchanges are now frequently carried out by using hand-held computers in a wireless LAN environment rather than the system of complex hand signals that were but only a few years ago common place on trading floors. Similarly, many medical centers now employ hand-held computers linked by wireless transmissions to their LAN to allow health care professionals to instantly access patient records for bedside critical care. Retail stores have also begun linking their registers by wireless communications to their store computer via the LAN to permit point-in-time updating of sales information and stock re-ordering.

While wireless LANs have found widespread use in commercial settings, they have only more recently been employed in academic settings.

Many schools, laboratories and class rooms were built prior to the widespread use of computers. As such they lack the wiring necessary for a institution-wide conventional LAN. Initially many of these schools opted for stand-alone computers for class room use, and a separate more circumscribed LAN environment for administrative use. However, the not infrequently seen incremental increase in the cost of software site licenses for stand-alone computers, as compared to network licenses, frustration with bottlenecking information access and information utilization by storing data on a plurality of distinctly different non-interconnected data storage units, a recognition of the inefficiencies involved in maintaining multiple, often distinctly different, software programs on each unit, as well as the clamoring for instantaneous access to networked information and the need for centralized storage of data, has led many schools to seek alternatives to such a tiered data processing system, such as the wireless LAN system.

As enrollment in a particular academic study may vary greatly year to year, the demand for access to network services in a particular classroom or laboratory may change significantly. The wireless LAN network provides a significant advantage to academic institutions, over a completely wired LAN network, in that it permits limited computer resources to be extemporaneously reallocated to classrooms and laboratories where they are needed with minimum cost and effort. Computers having aerial transmission capability, that is the ability to transmit signals by wireless means through the air, can be rolled into and out of class rooms or laboratories permitting connection, for example, to the networked CD-ROM server or automated library card catalog. By means of such a wireless system, data generated in a laboratory can easily be stored on the network or sent in real time to other transmissible destinations, such as the computer lab where students may be working on reports.

As set forth above, adoption. of wireless LAN technology by academic institutions has been motivated in great part by a desire to avoid expensive cabling, improve information flow, to save money and to improve allocation of limited computer resources. Little motivation for such systems has arisen, however, owing to specific applications to which such technology may be advantageously employed to resolve problems commonplace in the academic environment.

Academic institutions suffer from several problems associated with their unique mission, that is, education of their enrollees. As part of this mission, there is significant need to control and monitor numerous student activities throughout an academic day. Most academic institutions are faced with limited resources to control and monitor such activities. Commonplace needs in such institutions include the need for tracking student attendance of classes and student movement, the need to monitor student possession and use of institutional inventory, the need to secure access to the institution and test sessions, and the need to monitor student progress in learning.

Given the widespread importance placed in our society on grades, and the relative position of a student scholastically with respect to the student's peers, students are often inflicted with a great pressure to excel. The overall grade point average of a student in an institution may have dramatic impact on the student's future career opportunities and advancement opportunities. Teachers therefore must take great care in scoring tests and associating the test scores with the appropriate student. Errors are not infrequently made. Further, certain students succumb to the desire to excel at any cost. This has led to several unsavory practices such as students employing third parties versed in a particular subject matter to take an exam in that subject area in their name.

In elementary academic institutions, there is also a significant segment of the student population that rebels against the academic environment, attendance of which is often compulsory by law. These students not infrequently attempt to minimize their participation in the academic environment by skipping school or classes, anticipating the failure of the instructor to take attendance.

In any academic environment, given the large number of students, there is also a significant need to track student access to, and use of, limited institutional resources. For example, students are frequently allowed to borrow materials from the institution, such as library books and computers, or to charge meals. Conventional schemes for recording the temporary possession and consumption, of these items by the student generally require considerable time for the input of student identification information along with the date and item placed in the students possession.

While a data processing telecommunication network capable of receiving aerial transmissions, such as a wireless LAN, arguably would aid in the recordation of such information by providing more readily accessible, real-time, data input devices in localities lacking wired connection to the institutional LAN, such networks alone provide no method for assuring the accuracy and validity of the data entered. It should be noted that the tracking of student attendance and student movement, the monitoring of student possession and use of institutional inventory, securing access to the institution and test sessions, and monitoring student progress in learning, all intrinsically require the accurate recordation of the student to the ascribed activity. Heretofore, the only methods available to assure that a particular student was indeed authorized to take an exam, had appropriately responded to an attendance call, had validly secured access to the institution or a test session, had indeed borrowed, loaned or used academic property, was either for an academic employee to know the student, and the activity which the student was permitted to undertake, or to compare the physical attributes of the student against a picture identity card issued by the institution and check institutional records to confirm authorization for that student. Further, association of a particular student with an activity, required manual input into student records, or manual input into a LAN terminal. Such methods of identification, confirmation and recordation are extremely time consuming, as well as error prone. For example, students have been known to forge identity cards by imposing their picture onto the card of another. Similarly, mis-association of the record of one student with that of another is not uncommon, particularly when the student names are similar.

There is therefore a need for an system and method which permits improved tracking of student attendance and student movement, monitoring of student possession and use of institutional inventory, securing access to the institution and test sessions, monitoring student progress in learning and which takes advantage of the improved access and real-time entry capabilities of a "wireless" LAN, and other "wireless" data processing telecommunication networks.

SUMMARY OF THE INVENTION

There is disclosed an improved system and method for tracking of student attendance and student movement, the monitoring of student possession and use of institutional inventory, securing authorized student access to the institution and test sessions, and monitoring student progress in learning. An embodiment of the present invention employs a data processing telecommunications network having wireless communication capability, an electro-optical reader, a student identity card having encoded indicia thereon correlatable to the student's identity and readable by the electro-optical reader, and a processor for correlating confirmed student identity information with student activity information.

An embodiment of the present invention comprises a wireless data processing telecommunications network comprising a backbone, a server in communication with the backbone, an access point in communication with the backbone and a mobile station in wireless communication with the access point, wherein said server has a memory associated therewith, and wherein the mobile station. comprises: an electro-optical reader for scanning encoded indicia and converting the encoded indicia into a first signal representing the encoded indicia, wherein the encoded indicia represents an image of a person and a code identifying the person; an operator interface operatively connected to said electro-optical reader for generating a second signal indicative of an activity of the person in response to operator manipulation of said operator interface; an electro-optical processor, operatively connected to said electro-optical reader and said operator interface, for receiving the first and second signals; a transceiver operatively connected to said electro-optical processor; a display operatively connected to said electro-optical processor; wherein said electro-optical processor is operatively configured and adapted to: display the image of the person on the display based on the first signal, and upon receipt from said interface of a third signal indicating correlation between the image and the person undertaking or wishing to undertake the activity, to cause said transceiver to transmit a fourth signal indicating activity and the person identified by the encoded indicia to said server over said access point of said backbone so that the activity of the person and the identity of the person can be stored in said server memory.

Also is disclosed, in a wireless data processing telecommunications network comprising a backbone, a server in communication with the backbone, an access point in communication with the backbone and a mobile station in wireless communication with the access point, wherein said server has a memory associated therewith, a method for recording an activity of a student carrying a substrate having encoded indicia identifying the student comprising the steps of: reading from the substrate the encoded indicium using an electro-optical reader; generating a set of first data indicative of the identity of the student; generating a second set of data indicative of an activity of the student; transmitting aerially a signal representing the first and second set of data to said wireless data processing telecommunications network; and storing in said server memory of said wireless data processing telecommunications network data indicative of the activity ascribed to the student.

Further is disclosed, in a wireless data processing telecommunications network comprising a backbone, a server in communication with the backbone, an access point in communication with the backbone and a mobile station in wireless communication with the access point, wherein said server has a memory associated therewith, a method for obtaining from a student carrying a substrate having encoded indicia identifying the student, information from institutional records, comprising the steps of: reading from the substrate the encoded indicium using an electro-optical reader; generating a set of first data indicative of the identity of the student; generating a second set of data indicative of an inquiry pertaining to the student's institutional record; transmitting aerially a signal representing the first and second set of data to said access point of said wireless data processing telecommunications network; processing the aerial signal in said data processing telecommunications network environment such as to resolve the inquiry by accessing said institutional records stored in said server memory; and transmitting aerially a signal from said access point of said data processing telecommunications network representative of a response to said inquiry pertaining to the student's institutional record.

In another embodiment of the present invention there is disclosed a method for confirming the identity of a student presenting a presenting a substrate having encoded indicia correlateable with the image of the student: converting the actual image of a person presenting the substrate as identification into a first digital data stream; reading the encoded indicia on said substrate by means of an. electro-optical reader to produce a second digital data stream; comparing said first digital data stream to said second digital data stream; and signaling confirmation of identity if there is significant correspondence between the first and second digital data streams.

In yet another embodiment of the present invention, there is disclosed, in a wireless data processing telecommunications network comprising a backbone, a server in communication with the backbone, an access point in communication with the backbone and a mobile station in wireless communication with the access point, wherein said server has a memory associated therewith, a method for administering and grading examinations given to a student carrying a substrate having identity encoded indicia thereon identifying the student, comprising the steps of: placing on an examination a test encoded indicia uniquely associated with said examination; encoding the answers to said examination with answer encoded indicia associated with each answer to a question on the examination; reading said identity encoded indicia, said test encoded indicia and said answer encoded indicia by means of an electro-optical reader; transmitting aerially from said electro-optical reader processor a signal indicative of said identity encoded indicia, said test encoded indicia and said answer encoded indicia to said access point of said data processing telecommunications network; and grading such test in said data processing telecommunications network backbone by comparing the answer information provided by the identified student with respect to the identified test against the correct answers associated with said identified test.

In yet another embodiment of the present invention, there is disclosed, in a wireless data processing telecommunications network comprising a backbone, a server in communication with the backbone, an access point in communication with the backbone and a mobile station in wireless communication with the access point, wherein the server has a memory associated therewith, a method for tracking attendance comprising the steps of: assigning each person in a group of people a unique identification symbology; collecting the unique identification symbologies from persons attending an event; transmitting aerially from the mobile station to the access point of the data processing telecommunications network a signal indicative of the unique identification symbologies collected from the persons attending an event and of the event itself; processing in the data processing telecommunications network the transmitted signal such that the identity of the persons attending the event is correlated with the event in said memory.

In yet another embodiment of the present invention, there is disclosed, in a wireless data processing telecommunications network comprising a backbone, a server in communication with the backbone, an access point in communication with the backbone and a mobile station in wireless communication with the access point, wherein said server has a memory associated therewith, a method for providing transmission of information directed to a person in an institution, comprising the steps of: assigning said mobile station to a person; transmitting aerially from said mobile station to said access point of said data processing telecommunications network a signal indicative of the identity said person to which said mobile station has been assigned and the particular mobile station from which such signal is sent; processing in said data processing telecommunications network said transmitted signal such that the identity of the person assigned said mobile station is correlated with the particular mobile station which was assigned in said memory; transmitting from said data processing telecommunications network, to said mobile station assigned to said person, information received by said data processing telecommunications network which is directed to said person while said mobile station is assigned to said person. The particular processing telecommunications network may employ a mobile station which may have pager functionality, such that the person may be informed of a message, or may have telephone functionality, such that the person may actually communicate verbally with another person through the mobile station. The mobile station may also comprise a telephone, and may be equipped with a S24 card radio.

In yet another embodiment of the present invention, there is disclosed, in a wireless data processing telecommunications network comprising a backbone, a server in communication with the backbone, an access point in communication with the backbone and a mobile station in wireless communication with the access point, wherein said server has a memory associated therewith, a method for providing transmission of information directed to a specific location in an institution, comprising the steps of: assigning said mobile station to a specific location; transmitting aerially from said mobile station to said access point of said data processing telecommunications network a signal indicative of the identity of said specific location to which said mobile station has been assigned and the particular mobile station from which such signal is sent; processing in said data processing telecommunications network said transmitted signal such that the identity of said specific location to which said mobile station has been assigned is correlated with the particular mobile station which was assigned in said memory; transmitting from said data processing telecommunications network, to said mobile station assigned to said specific location, information received by said data processing telecommunications network which is directed to said specific location while said mobile station is assigned to said specific location. The particular processing telecommunications network may employ a mobile station which may have pager functionality, such that the person may be informed of a message, or may have telephone functionality, such that the person may actually communicate verbally with another person through the mobile station. The mobile station may also comprise a telephone, and may be equipped with a S24 card radio.

Also is disclosed is a wireless data processing telecommunications network comprising a backbone, a server having memory associated therewith in communication with the backbone, an access point in communication with the backbone, a vending machine, incorporating an electro-optical reader, offering the selection of one or more items for one or more monetary values, which is in wireless communication with the access point, and a monetary credit machine, incorporating: an electro-optical reader, capable of debiting monetary value from a monetary source, which is in communication with the backbone. Such wireless data processing telecommunications network may be used to effectuate a method for crediting and debiting a student's account comprising one or more steps of: providing a student with a substrate having encoded indicia identifying the student; placing the substrate into the monetary credit machine; reading the indicia on the substrate using the monetary credit machine electro-optical reader; placing a source of monetary value, such as, but not limited to, currency, a credit card, a debit card, a SmartCard® having monetary value, and the like, into the monetary credit machine and correlating the same, or a fraction thereof, with the identity of the student encoded by the indicia on the substrate; crediting on the server in a student account database stored in server memory a certain amount of the monetary value placed in the monetary credit machine to the identity of the student represented by the encoded indicia; inputting the student substrate into the vending machine and reading the encoded indicia using the vending machine electro-optical reader; selecting a priced item from said vending machine; transmitting the identity of the student and the item value selected from the vending machine to the access point; debiting the amount of any vending machine purchase from the account database associated with the student.

Other advantages of the invention will be apparent from the following more detailed description of the preferred embodiments, taken in conjunction with the accompanying drawings, which illustrate, by way of example, the principles of the invention.

BRIEF DESCRIPTION OF THE DRAWINGS

So that those having ordinary skill in the art to which the subject invention pertains will more readily understand how to make and use the improved system disclosed herein and to employ the improved method of scanning described, preferred embodiments of the invention will be described in detail herein below with reference to the drawings wherein features of the present invention are illustrated.

DETAILED DESCRIPTION OF THE PREFERRED EMBODIMENTS

Figure 1:
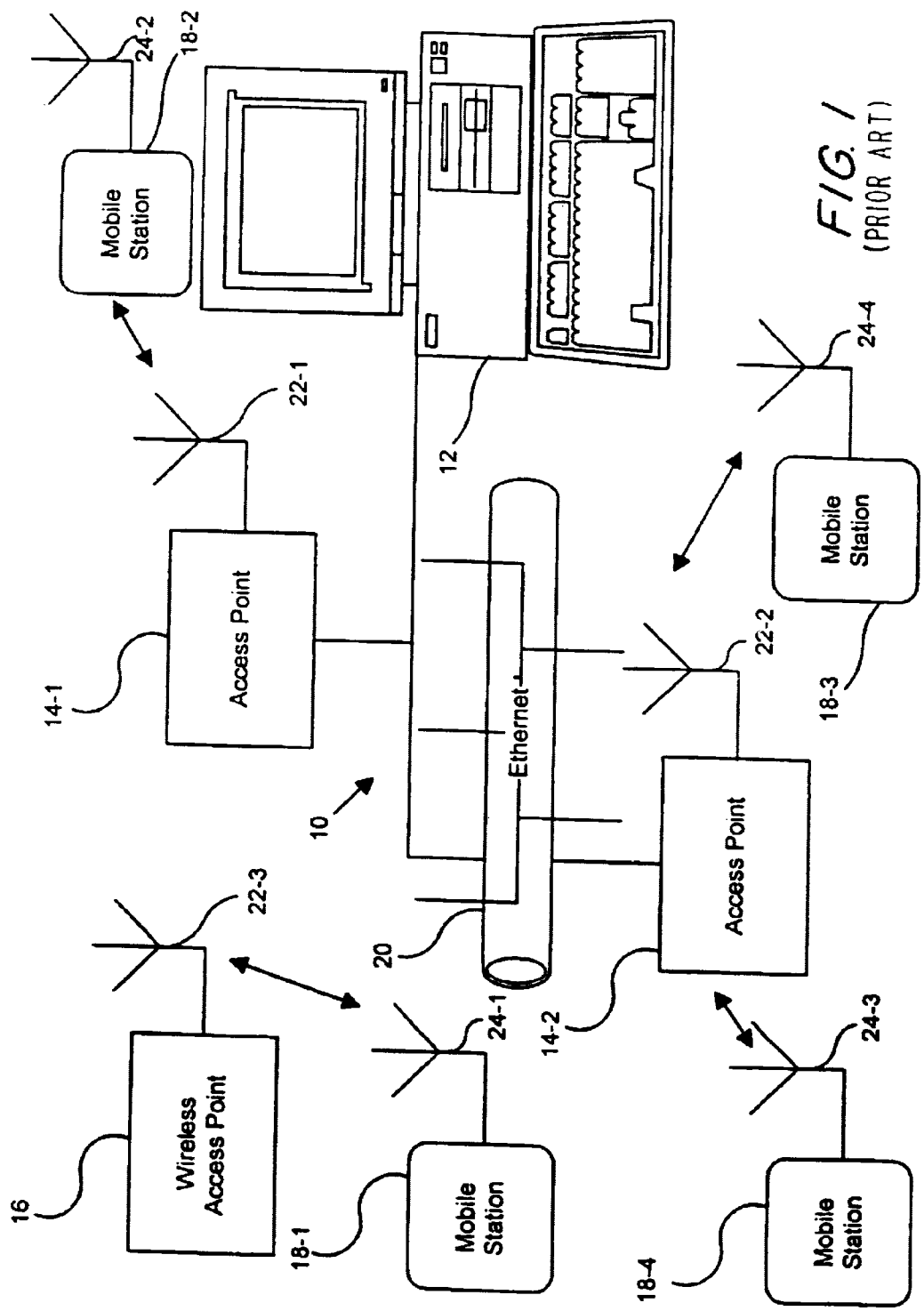
FIG. 1 is a schematic conventional prior art wireless computer network comprising multiple access points each servicing one or more mobile stations

According to this invention, there is disclosed an improved system and method for tracking of student attendance and student movement, the monitoring of student possession and use of institutional inventory, securing authorized student access to the institution and test sessions, and monitoring student progress in learning. The improved systems and methods disclosed preferably are employed using a data processing telecommunications network.

By "data processing telecommunications network" it is meant any one of the many data processing network systems used conventionally, including, without limitation, PBX and LAN networks, in which two or more data processing devices communicate with each other and/or with a centralized host, having any of the many network topologies known, including, without limitation, a star network topology, a ring network topology, a token ring network topology, a bus network topology, and other similar network systems and topologies which may be developed in the future. By "LAN" it is meant a telecommunications network linking a plurality of processors and/or peripherals which has its own dedicated channels. A LAN typically has a "server", a computer in the network that sorts various programs and data files for use on the network, and determines access and availability in the network. A server may be a powerful personal computer with large hard disk capacity, workstations, minicomputers, mainframe, or specialized computer. The server typically contains the LAN's network operating system, which manages the server and routes and manages communications of the network.

The systems and methods of the present invention may require assignment of a unique identifier to a person or location, such identifier which may be stored on a card substrate as encoded indicium By "substrate" it is meant any material. By "card substrate" it is meant any substrate in any shape that is easily carried on a person's body and includes, but is not limited to, a polymeric card, a cellulosic-based card, etc.

By "encoded indicium" it is meant data sorted on or in a substrate in magnetic form, electrical form or in less than full text print form in such a manner that such indicium may be read by an electro-optical reader. Preferably if print is used, the print is "symbolic print", that is print symbolic of full text, without recourse to characters of conventional international languages and/or numerics, such as Arabic numerals, Roman numerals, English language characters, Japanese language characters, Russian language characters, Chinese language characters, etc.

"Electro-optical readers" are used for reading indicium recorded on indicium-encoded substrates. "Electro-optical readers" transform printed, magnetically and/or electrically stored, indicia on a substrate into electrical signals decipherable by a reader processor coupled thereto, or incorporated therein. By "electro-optical readers" it is meant to include, without limitation, standard optical scanners, such as, e.g., a bar-code reader, capable of transmitting a light wave to an indicium and decoding the reflected light form the indicium, electromagnetic readers, such as, e.g., credit card readers, capable of generating a magnetic field and decoding changes in such magnetic field as the indicium is moved through such field, and download readers, such as, e.g., "SmartCard®" readers, accepting a data stream from an electronic memory storage unit stored on a card, such memory storage unit frequently being coupled to an ASIC or microprocessor. Typically signals generated by an electro-optical scanner are decoded into alphanumeric characters.

As both magnetic and electronic storage of data on a substrate are arguably more susceptible to undetectable alteration and to corruption by electromagnetic fields, it is preferred that the identity card substrate used in the present system and method have data encoded thereon print, and that the electro-optical reader employed be an optical-type electro-optical reader. Widespread use of the optical-type electro-optical reader, or "optical reader," has been made with respect to the reading of printed matrices, in particular bar code symbols.

A bar code symbol is symbolic print consisting of a coded pattern of indicia. Bar code symbols are widely used to identify an article or a characteristic of an article. Bar codes may be one-dimensional, conventionally comprised of a series of bars of various widths spaced apart from one another to bound spaces of various widths, the bars and spaces having different light reflecting characteristics. One dimensional bar codes typically serve as an access code that serves as a real-time key for opening a database. Bar codes may further be more complex such as a two-dimensional bar code that consists of numerous symbols dispersed throughout a delimited space which record actual data, such as text and/or graphics, without the need for access to a host relational-database for conversion of the code into the related data. So-called "three dimensional" bar codes are also known. Composite codes comprising, for example, a two-dimensional code above or below a one-dimensional code are also known. A composite code wherein one code type printed in one ink type having particular absorption and emission characteristics is placed on top of another code type printed in an ink type having a different absorption and emission characteristic may also be used as a bar code. By "bar code" it is meant to include one, two, and three dimensional bar codes and composite codes.

Optical readers may employ monochromatic light generation means, such as a gas laser or semiconductor laser, and/or non-coherent light sources, such as light emitting diodes (LEDs). The use of semiconductor devices as the light source is especially desirable because of their small size, low cost and low voltage requirements. Laser light may be generated by a helium-neon gas laser, emitting red laser light at a wavelength of about 6328 Angstrom units, and may be generated by a semiconductor laser diode, generally emitting laser light at a wavelength of about 7800 Angstrom units, bordering on the infrared spectrum. Light reflected by, or scattered from, the scanned indicia is detected by means of photodetectors or sensors positioned in the scanner in an optical path such that the photodetectors or sensors have a field of view which ensures capture of at least a portion of the light which is reflected or scattered off the symbols. Light detected is converted into an electrical signal. Electronic circuitry and software decode the electrical signal into a digital representation of the data represented by the indicium that has been scanned. Typically, a signal processor processes analog electrical input from the photodetectors and digitizes the signal. The digitized signal is decoded, according to specific symbology, by a decoder under control of software into a binary representation (or other digital representation) of the data encoded in the indicia, and to the alpha numeric characters so represented.

Preferably the electro-optical reader of the present invention is operatively connected to a display on which information may be displayed. By "display" it is meant any of the electronic-based screen displays currently available in the art or which in the future may be developed in the art. For example, such display, without limitation, may include a Liquid Crystal Display ("LCD"), an light emitting diode ("LED") display, an electron-beam-fluorescent screen based display, etc.

Preferably the electro-optical reader of the present invention is operatively connected to an operator interface. By "operator interface" it is meant any device permitting input of data by an operator, and may include, without limitation, a physical keyboard, a touch screen, a switch, for example, a game pad switch, an electronic mouse, a roller-ball based selection device, for example, permitting selection of icons on a display, and other such types of operator interfaces currently available in the art or which in the future may be developed in the art. Preferably, the operator interface has one or more input designated areas correlated with an emergency signal. For example, an electro-optical reader may be provided with a keyboard having one key associated with an emergency signal. Such key may be pressed by a teacher or other person if an emergency is discerned.

Preferably the electro-optical reader of the present invention is operatively connected to or incorporates a processor for processing input from the electro-optical reader. By "processor" it is meant any device for processing an input electrical signal, and for generating a processed electrical signal therefrom, including, without limitation, a microprocessor, DSP, ASIC, multiplexer, microchip, controller and other data processing devices currently available in the art, or which in the future may be developed in the art. Signals processed from the electro-optical reader are typically decoded by way of a "decoder." By "decoder" it is meant any device for decoding processed signals generated in response to the electro-optical read of indicium, and includes, without limitation, a processor under the control of a software program designed to implement a conversion algorithm related to the data encoded in the symbology of the indicia scanned, and other decoding devices currently available in the art, or which in the future may be developed in the art.

Both the electro-optical scanner and processor and one or more telecommunication network processors preferably are operatively connected to one or more data storage units. By "data storage unit" it is meant any device for storing electronic data, and includes, without limitation RAM, ROM, hard and floppy data storage disks, optical disks, WORM, tape drives, etc. and other types of electronic data storage devices currently available in the art, or which in the future may be developed in the art.

The electro-optical scanner and processors of the present invention are provided power by a power source. By "power source" it is meant any device for generating and supplying electrical power, and includes, without limitation, a battery, a DC current source, an AC current source, etc., and other means for generating and supplying electrical power currently available in the art, or which in the future may be developed in the art.

Preferably the wireless LAN employed in the present invention is compliant with the Institute of Electrical and Electronic Engineers (IEEE) 802.11 standard for unlicensed spread spectrum communications. The IEEE 802.11 standard specifies two possible data rates for data transmission, namely 1 Mbps (Megabit per second) and 2 Mbps. The standard further sets forth 66 frequency hopping patterns to minimize the probability that one mobile station—access point cell operates on the same frequency at the same time as another mobile station—access point cell. More frequency hopping patterns may advantageously be employed. Bridge architecture for communication with access points may employ PC cards, adapters, NDIS, ODI drivers, terminal emulation and standard protocol stacks. Preferably the aerial transmissions are in the 2.4 to 2.5 GHz radio frequency (RF) band range, more preferably in the 2.4 to 2.4835 GHz RF band frequency range, a frequency range set aside by many governments for data communications. Such range minimizes RF interference. The preferred access protocol is CSMA/CA (carrier sense multiple access with collision avoidance). The preferred mode of modulation is binary GFSK.

Figure 2:
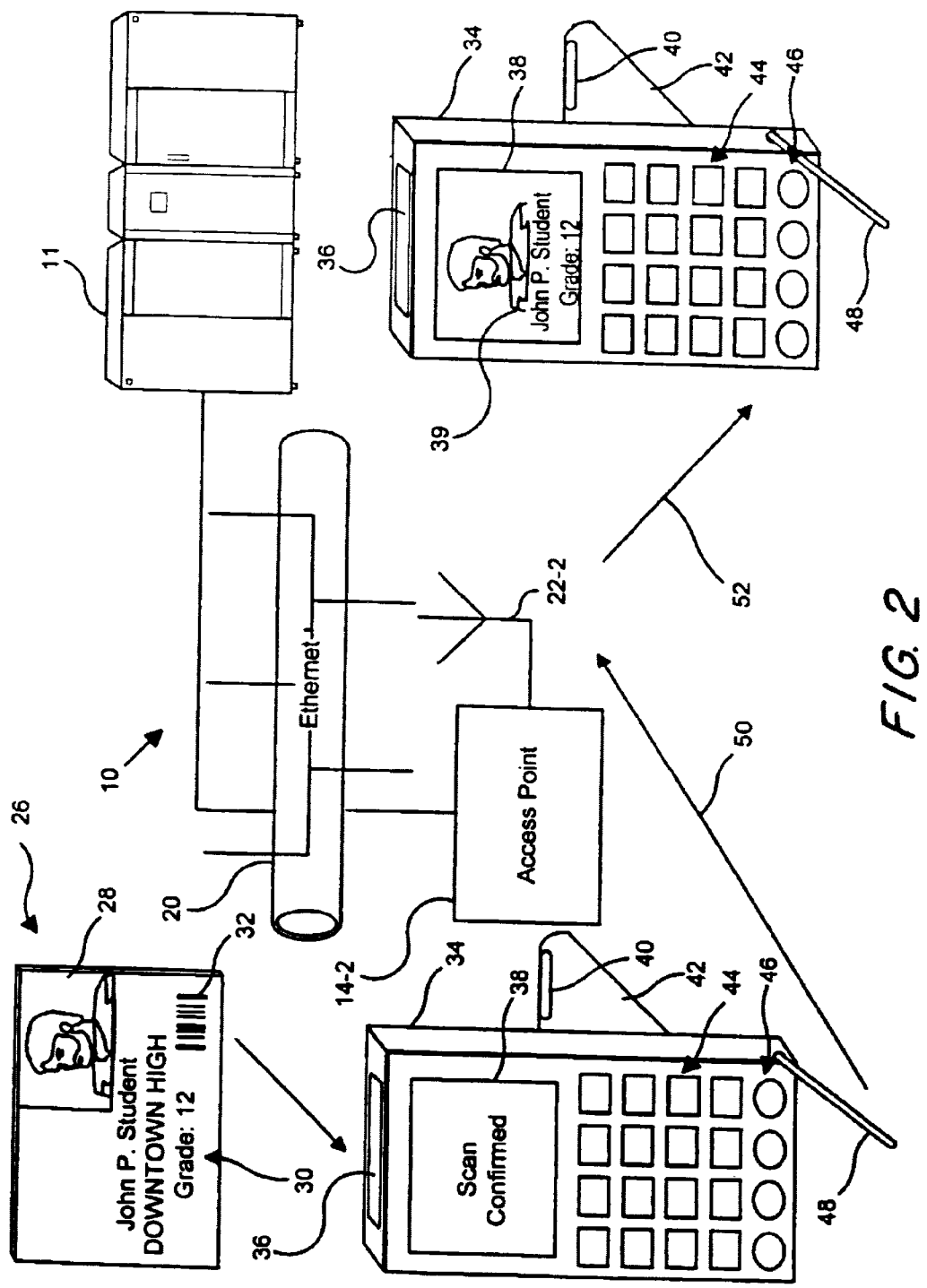
FIG. 2 is a schematic of a representative system embodiment of the present invention employing a one-dimensional bar code reader and a wireless LAN to confirm student identity and record student activity.

Referring to FIG. 2, there is shown a schematic of a representative system embodiment of the present invention employing a one-dimensional bar code reader and a wireless LAN to confirm student identity and record. student activity. A student is provided with identity card 26 on which may be placed a identity picture 28 and other identity information 30. Identity card 26 is imprinted with a one-dimensional bar code 32 which is associated with identification information, preferably including picture information, in a LAN database, such as in mainframe computer 11. In order to confirm the identity of a student presenting identity card 26, that is to confirm that the card has not been altered, one-dimensional bar code 32 is scanned into optical reader 34 at scanning portal 36. Preferably optical reader 34 is adapted with a handle 42 such that optical reader 34 may be easily held. Handle 42 is shown configured with a trigger 40 for triggering scanning at scanning portal 36. To permit input of data along with the scanned data, or to alter the programming of optical reader 34, optical reader 34 is equipped with an operator interface, which may be comprised of a number of data input keys 44 and pre-programmed data keys 46. Preferably optical reader 34 has a display 36 on which data may be visibly displayed in text and graphics. Optical reader 34 further comprises an antenna 48 for permitting output of data output transmission signal 50 and receipt of data input transmission signal 52. As shown, data output transmission signal 50, indicative of at least in part the scanned one-dimension bar code 32, is transmitted to: access point 14-2 by way of access point antenna 22-2 to backbone LAN 10, in this case shown as comprising ethernet 20 having connection to mainframe computer 11. Mainframe computer 11 processes signal 50 and after determining the corresponding picture and identity information associated with one-dimensional bar code 32, transmits the picture and identity information by way of access point antenna 22-2 in signal 52 to the same scanner (re-drawn on the right hand side of FIG. 1 for easy of illustration), which displays such information 39 on display 38.

Figure 3:
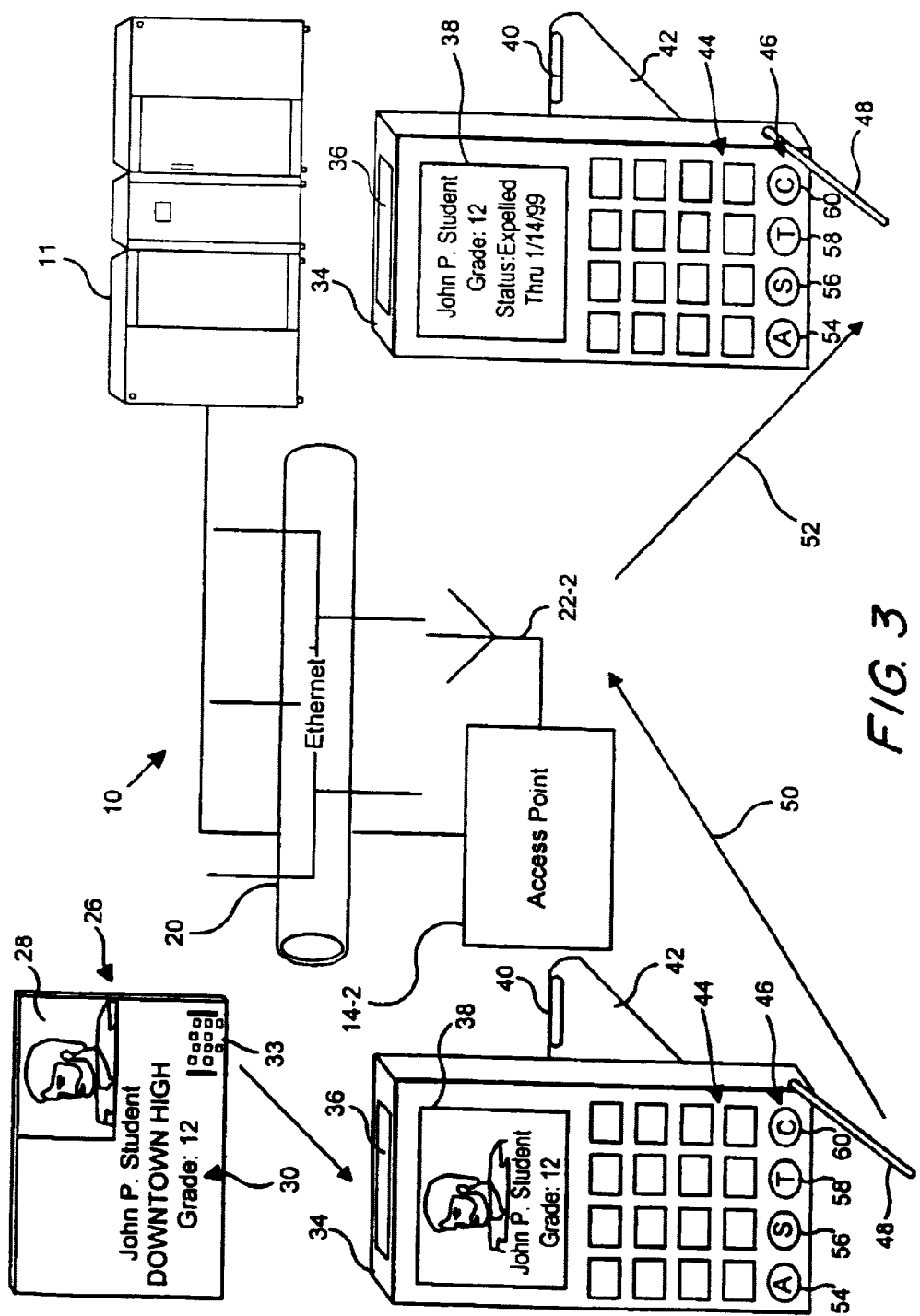
FIG. 3 is a schematic of a representative system embodiment of the present invention employing a two-dimensional bar code reader and a wireless LAN to confirm student identity and record student activity.

Now referring to FIG. 3, there is shown a schematic of a representative system embodiment of the present invention employing a two-dimensional bar code reader and a wireless LAN to confirm student identity and record student activity. As in FIG. 2, student is provided with identity card 26 on which may be placed a identity picture 28 and other identity information 30. Identity card 26, in this case, :is imprinted with a two-dimensional bar code 33 which records graphic and/or textual data in representation of the indicium. In order to confirm the identity of a student presenting identity card 26, that is to confirm that the card has not been altered, two-dimensional bar code 33 is scanned into optical reader 34 at scanning portal 36. Graphic and/or textual information, and preferably both, are then displayed on display 38 to allow the operator of optical reader 38 to confirm that the holder of identity card 26 is the person represented on the card.

To permit input of data along with the scanned data, or to alter the programming of optical reader 34 of FIG. 3, as in FIG. 2, optical reader 34 is equipped with an operator interface, which may be comprised of a number of data input keys 44 and pre-programmed keys 46. Pre-programmed keys 46 may be programmed or their circuitry designed to provide a signal interpretable by a program in mainframe computer 11 as indicating a certain activity correlated with a student, such as attendance key 54, or inventory checkout key 60, or may be correlated in a program stored in main frame computer 11 with an inquiry, such as status request key 56, or test admission authorization key 58. Such activity data, or request inquiry, is coupled with student identification data gleaned from the read of two-dimensional bar code 33 and transmitted by way of signal 50 to access point 14-2 which is connected to backbone LAN 10. Mainframe computer 11 processes signal 50, stores correlated activity-identity data and responds to inquiry requests by transmitting a signal 52 by means of access point 14-2 back to optical reader 34 (re-drawn on the right hand side of FIG. 3 for ease of illustration), as illustrated, indicating that the student presenting the identity card was expelled from school, and the length of the expulsion. Transmitted activity-identity data may also be processed by the backbone LAN processors, such as mainframe computer 11, such that the LAN processor confirms from an activity authorized student database that the student is authorized to undertake the activity.

Figure 4:
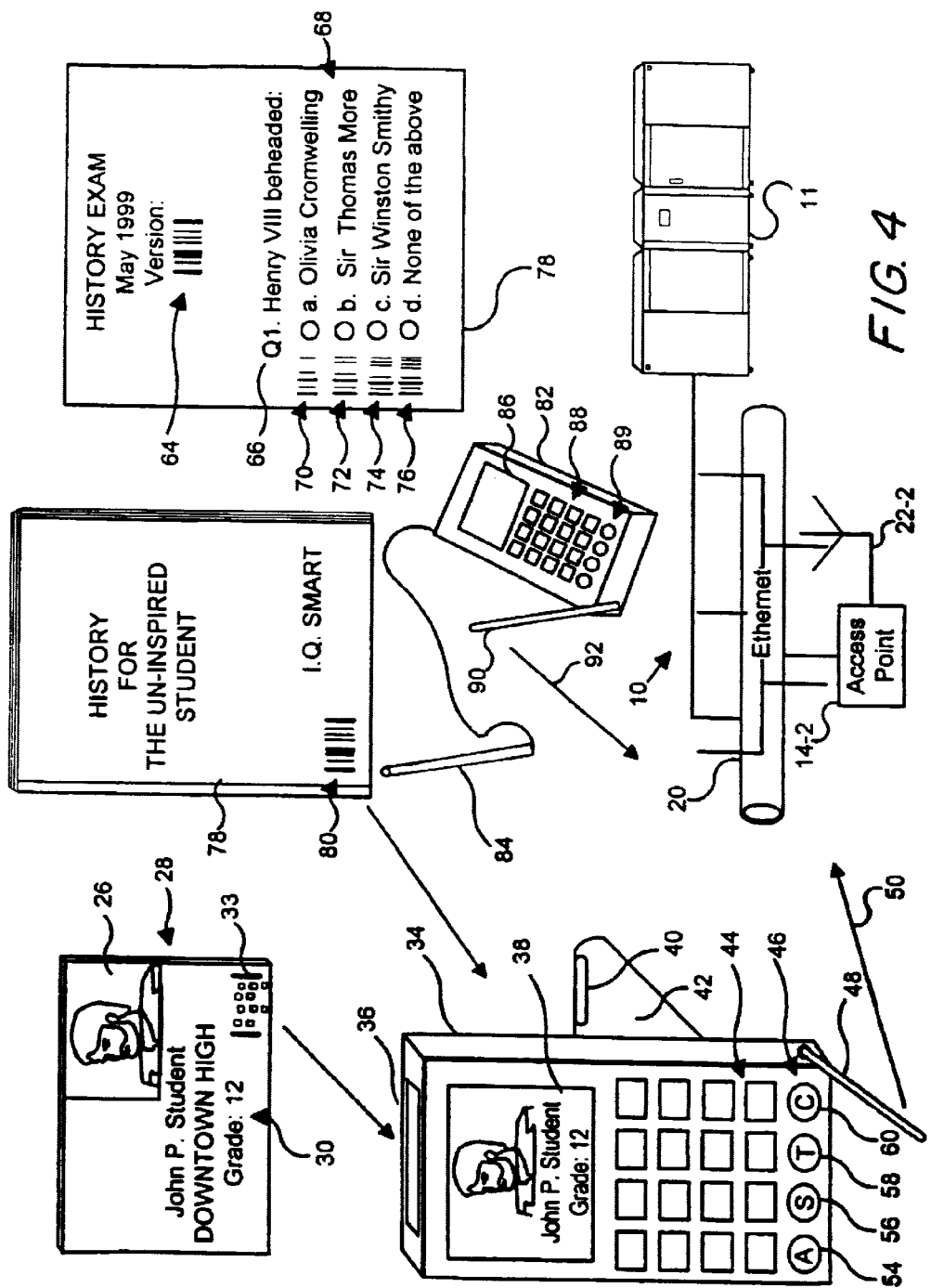
FIG. 4 is a schematic of a representative system embodiment of the present invention for recording student possession of institutional inventory and correlating test answers with a student.

FIG. 4 schematic of a representative system embodiment of the present invention for recording student possession of institutional inventory and correlating test answers,with a student. As in FIG. 3, a two-dimensional bar code 33 placed on identity card 28, incorporating therein data pertaining to the picture of the authorized card carrier, is scanned into optical reader 34 permitting confirmation that the presenter of the identity card is the authorized card holder.

Once the identity of the student is confirmed by matching the picture encoded in two-dimensional bar code 33 with the student presenting the card, optical reader 34 may further be used to scan bar codes placed on institutional inventory which the student wishes to use for a period of time, such as one-dimensional bar code 80 illustrated to have been placed on book 78. Preferably the bar code on the institutional inventory is at least two-dimensional, including information which permits confirmation that the bar code applies to the inventory to which it is appended (to prevent exchange of bar code indicia). The coupled identity-inventory information, which may further be coupled with time information relating to the time for which the loan is authorized, is transmitted by signal 50 to backbone LAN 10 connected to main frame computer 11 which may store such data, or transmit other data in response to such coupled data. Transmitted identity-inventory data may also be processed by the backbone LAN processors, such as mainframe computer 11, such that the LAN processor confirms from a database correlating inventory with students authorized to use the inventory, that the student is authorized to use the inventory.

Instead of a manual confirmation of the student's identity by visual comparison of a picture on electro-optical scanner display with the person presenting the identity card, automated confirmation may be made. In such an embodiment, a digital video camera is interfaced into the system so as to transmit a digital signal representative of the person inserting the identity card, such as disclosed in U.S. Pat. No. 5,550,359, herein incorporated by reference. A processor in the electro-optical reader 34 or in the network backbone 10 in such embodiment is operatively configured and adapted to process and compare the video image of the person presenting the card against data representative of the physical picture of the authorized holder of the card stored either in data storage operatively connected to the network or stored on the identity card. Upon confirmation of identity, the processor may be configured to permit automated entry into a testing zone (as for example permitting access into a locked room) or automated check-out of a piece of institutional inventory (such as a book), etc.

Also illustrated in FIG. 4 is an improved system by which a student may take a test and by which a student's learning may be monitored. After confirming the identity of a student, the student may be permitted to use a pen-based scanner 82 to take a indicia-coded test 78. Pen-based scanner 82 preferably is provided with display 86 for displaying visually text and graphic information, an operator interface device, which may be comprised of input data keys 88 and pre-programmed function keys 89, a pen scanner 84, and an antenna 90 for transmitting and receiving data. The indicia-coded test 78 may be made available in a number of versions to cut down on cheating by students to try to determine the responses of other students. Test version indicia 64 is scanned by pen scanner 84 of pen-based scanner 82. The student, likewise, scans identity indicia, in this case two-dimensional bar code 33, so as to permit correlation between the student identity and the test-being taken. An answer, 68, to a test question, 66, is indicated by the student by scanning in answer indicia, in this case one-dimensional bar codes, 70, 72, 74, 76. Preferably, the student need not scan in an indicia indicative of the test question. Rather, it is preferred that the answer indicia be correlateable with the question to which they relate. Further, the answer indicia may be configured, particularly if a two-dimensional bar code is used (due to the great difficulty which would be involved in student's visually deciphering the meaning of the same), such that the code indicates that a particular answer is correct. The latter permits an instructor to construct a test without need of providing a correct answer sheet for input into the institutional processor which will be used to grade the exam. The answer code, in particular, if a two-dimensional bar code with text encodation, may also include information as to why the answer chosen is incorrect. The test version indicia may be correlatable with the number of questions in an exam, thereby not requiring the instructor to provide any information pertaining to the exam for input into the institutional processor (the number of questions in the test and the number of correct answers being provided by the student, without repetition of a correct answer, being used to grade the exam). Once the student has finished taking the exam, the student may transmit to backbone LAN 10 by way of pen-based scanner 82 antenna 90 and access point 14-2 antenna 22-2, a signal 92 representative of the student's identity, the exam taken, and the student's answers to the exam. Such information is processed by a processor connected to backbone LAN 10, in this case main frame computer 11 in such a manner that identified student is given credit for in the institutional records for the correct answers provided. Main frame computer 11 may further be programmed to transmit a signal back to pen-based scanner 82 which may be representative of the student's grade on the exam and may programmed to transmit the correct answers to the exam.

Figure 5:
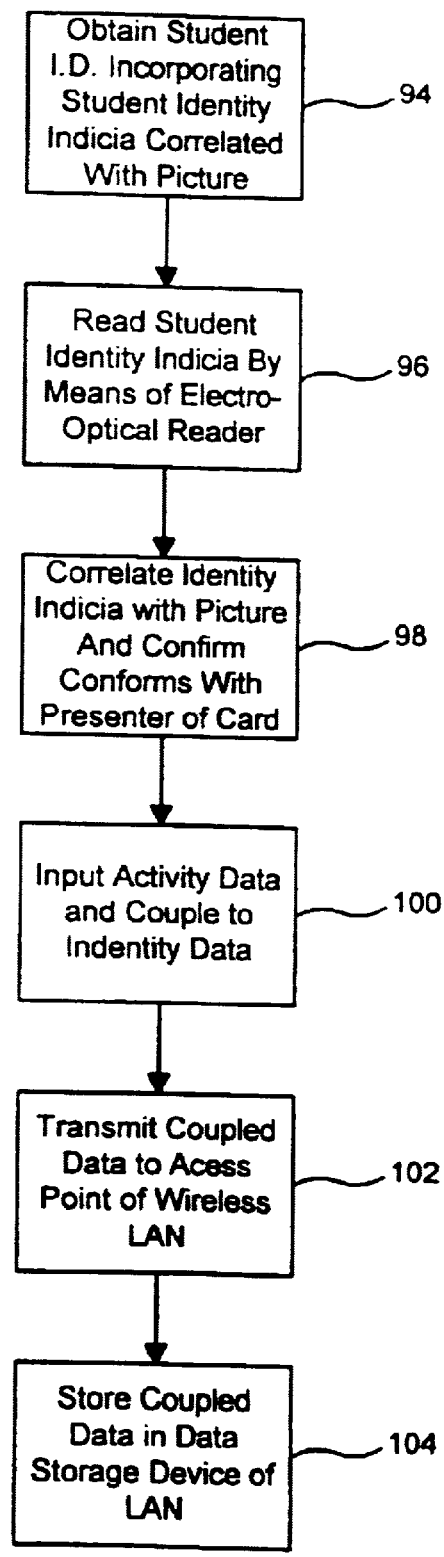
FIG. 5 is a block diagram of a method for correlating student activities with a student identity.

FIG. 5 is a block diagram of a method for correlating student activities with a student identity In block 94, identification information incorporating student identity indicia correlatable with the picture of the student to whom the card was issued is obtained from a student. The identity indicia is subsequently read by means of an electro-optical reader (block 96). In block 98, the identity picture correlatable with the identity indicia is compared with the visage of the presenter of the card. If their is a match, activity data may be input into the electro-optical scanner and correlated by way of a processor with the identity data (block 100). The correlated data is than transmitted to an access point of a wireless LAN, or other data processing telecommunications network having aerial transmission capability (block 102).

The correlated data is then stored in a data storage device coupled to wireless LAN (block 104).

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of confirming identities of students participating in scholastic activities, comprising the steps of:
   a) issuing each student a portable identity card for presentation at an activity, and providing each card with a machine-readable symbol encoded with data which uniquely identifies the respective student;
   b) establishing a wireless network by providing a mobile, data collection terminal at each activity, each terminal having a display, an actuatable electro-optical reader, and a transceiver in wireless communication with the network;
   c) identifying a student upon presentation of a card at an activity by actuating the reader to read the symbol on the card to decode the data, by transmitting the decoded data via the transceiver to the network, by retrieving an image of a face of the student via the transceiver from the network, and by displaying the image on the display;
   d) confirming the identity of the student by comparing the image of the face on the display with the face of the student;
   e) equipping each terminal with a plurality of actuatable activity keys identifying the activities, wherein the activity keys include an attendance key for indicating the presence of the student at the activity, a status request key for requesting eligibility of the student to attend the activity, a test admission authorization key for requesting eligibility of the student to take a test at the activity, and an inventory checkout key for indicating that the student has removed an object from the activity;
   f) correlating the identity of the student with an activity by actuating the respective key identifying the activity, and by transmitting activity-identity data of the identity of the student correlated with the activity via the transceiver to the network; and
   g) retrieving information associated with the activity-identity data from the network, and displaying the information on the display.

2. The method of claim 1, wherein the symbol is a one-dimensional bar code symbol which, when read by the reader, decodes the data as bar code data; and wherein the establishing step includes a server on the network and having a database in which bar code data and images of the faces of the students are correlated and stored.

3. The method of claim 1, wherein the symbol is a two-dimensional bar code symbol which, when read by the reader, decodes the data as image data, and wherein the step of displaying the image on the display is performed by using the image data.

4. The method of claim 1, wherein the comparing step is visually performed by a human operator of the respective terminal.

5. The method of claim 1, wherein the comparing step is performed by capturing an image of a face of the student with a camera at the activity, and by automatically comparing the captured image with the image on the display.

6. The method of claim 1, and further comprising the step of taking a test by providing the student with a hand-held device having an electro-optical reader for recording answers to test questions by reading symbols associated with the answers chosen by the student.

* * * * *